(12) United States Patent
Medvinsky (10) Patent No.: US 6,892,308 B1
(45) Date of Patent: May 10, 2005

(54) INTERNET PROTOCOL TELEPHONY SECURITY ARCHITECTURE

(75) Inventor: Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 905 days.

(21) Appl. No.: 09/668,426

(22) Filed: Sep. 22, 2000

Related U.S. Application Data (63) Continuation-in-part of application No. PCT/US00/09318, filed on Apr. 7, 2000, and a continuation-in-part of application No. PCT/US00/02174, filed on Jan. 28, 2000.
(60) Provisional application No. 60/128,772, filed on Apr. 9, 1999.

(51) Int. Cl.[7] .................................. H04L 9/32
(52) U.S. Cl. ................. 713/201; 713/200; 713/202; 713/169; 713/170; 380/262; 380/277; 380/278; 380/279
(58) Field of Search ................ 713/200–202, 713/169, 170; 380/277–279

(56) References Cited

U.S. PATENT DOCUMENTS

| | | | | |
|---|---|---|---|---|
| 5,261,070 A | * | 11/1993 | Ohta | 713/202 |
| 5,434,918 A | * | 7/1995 | Kung et al. | 713/169 |
| 5,590,199 A | | 12/1996 | Krajewski, Jr. et al. | |
| 5,668,876 A | | 9/1997 | Falk et al. | |
| 5,729,608 A | * | 3/1998 | Janson et al. | 713/171 |
| 5,778,065 A | * | 7/1998 | Hauser et al. | 713/155 |
| 5,812,664 A | * | 9/1998 | Bernobich et al. | 380/278 |
| 5,931,947 A | * | 8/1999 | Burns et al. | 713/201 |

(Continued)

FOREIGN PATENT DOCUMENTS

| | | | | |
|---|---|---|---|---|
| WO | WO9508885 A1 | * | 3/1995 | H04L/9/08 |
| WO | WO0195074 A2 | * | 12/2001 | G06F/1/00 |
| WO | WO0225899 A1 | * | 3/2002 | H04L/29/06 |

OTHER PUBLICATIONS

Agranat, Ian, Authentication standardizes Web, 1998, Electronic Engineering Times, p. 78.*
Kapp, Steve, Securing connected devices, 2002, Embedded Systems Programming, pp. 21, 22, 24, 26, 28, 30, 33.*
Lee et al, A public–key based authenication and key establishment protocol coupled with a client puzzle, 2003, Journal of the American Society for Information Science and Technology, pp. 810–823.*
Takizawa et al, Secure Group Communication Protocol for Distributed Systems, 1993, IEEE, pp. 159–165.*
Roscoe, A.W., Proving security protocols with model checkers by data independence techniques, 1998, IEEE, pp. 84–95.*
Cheng et al, A security architecture for the Internet Protocol, 1998, IBM Systems Journal, pp. 42–60.*

*Primary Examiner*—Ayaz Sheikh
*Assistant Examiner*—Aravind K Moorthy
(74) *Attorney, Agent, or Firm*—Townsend and Townsend and Crew LLP (57) ABSTRACT

A system is provided in which a client/server/network can implement a key management session when the server initiates the key management session utilizing a nonce. The nonce allows a wakeup or trigger message to be conveyed to the client such that a service attack on the server can be avoided when a false nonce is received by the server with an AP request message. Thus the server can disregard AP request messages that are not accompanied by a nonce stored by the server. The method can be implemented through circuitry, electrical signals and code to accomplish the acts described in the method.

1 Claim, 7 Drawing Sheets

U.S. PATENT DOCUMENTS

| | | | |
|---|---|---|---|
| 5,974,550 A * | 10/1999 | Maliszewski | 713/200 |
| 6,058,480 A | 5/2000 | Brown | |
| 6,064,736 A * | 5/2000 | Davis et al. | 713/155 |
| 6,065,120 A * | 5/2000 | Laursen et al. | 713/201 |
| 6,148,405 A * | 11/2000 | Liao et al. | 713/201 |
| 6,289,451 B1 * | 9/2001 | Dice | 713/168 |
| 6,304,969 B1 * | 10/2001 | Wasserman et al. | 713/172 |
| 6,363,365 B1 * | 3/2002 | Kou | 705/64 |
| 6,424,718 B1 * | 7/2002 | Holloway | 380/277 |
| 6,539,093 B1 * | 3/2003 | Asad et al. | 380/279 |
| 6,601,175 B1 * | 7/2003 | Arnold et al. | 713/202 |
| 6,775,772 B1 * | 8/2004 | Binding et al. | 713/171 |
| 6,799,270 B1 * | 9/2004 | Bull et al. | 713/153 |

* cited by examiner

INTERNET PROTOCOL TELEPHONY SECURITY ARCHITECTURE

This application is a continuation-in-part of PCT Application No. PCT/US00/02174 filed on Jan. 28, 2000 entitled "Key Management for Telephone Calls to Protect Signaling and Call Packets Between CTA's." This application is also a continuation-in part of PCT Application No. PCT/US00/09318 filed on Apr. 7, 2000 entitled, "Built-in Manufacturer's Certificates for a Cable Telephony Adapter to Provide Device and Service Certification," which claims the benefit of U.S. Application No. 60/128,772 entitled, "Internet Protocol Telephony Security Architecture" filed on Apr. 9, 1999 all of the above applications are hereby incorporated by reference for all that they disclose and for all purposes.

BACKGROUND

This invention relates generally to network security, and more particularly, to a system for providing key management between a server and a client, e.g., in a telephony or an IP telephony network.

In networks that are based on a client/server configuration, there is a need to establish a secure channel between the server and the clients. In addition, in networks that utilize a third party to certify a trust relationship, there is a need to provide an efficient mechanism that allows a key management message to be initiated by the server. In such networks that utilize a trusted third party for the server and client, the client can typically request an encrypted authentication token from the trusted third party that can be used to initiate key management with the specified server; however, the server will typically initiate the key management session directly with the client. It is less preferable for the server to obtain from the trusted third party encrypted authentication tokens for each of the clients. Such an approach would add overhead to a server, requiring it to maintain cryptographic state for each of the clients. If such a server were to fail, a backup server would be required to undergo a recovery procedure in which it has to obtain new authentication tokens for each of the clients. The clients need to be initialized during their provisioning phase to allow them to successfully authenticate to a trusted third party and obtain the encrypted authentication tokens. One proposed method for client initialization is disclosed in PCT Application No. PCT/US00/09318 entitled "BUILT-IN MANUFACTURER'S CERTIFICATES FOR A CABLE TELEPHONY ADAPTER TO PROVIDE DEVICE AND SERVICE CERTIFICATION." Nevertheless, a need exists to provide an efficient mechanism through which the server can initiate the key management session with the client, as opposed to a system in which only the client can initiate such a session.

One such client/server network is the client/server network that exists in IP telephony. In IP telephony systems, a cable telephony adapter (CTA) device can be used to allow a user to send and receive information in secure transactions over an IP telephony network. In typical operation, a series of signaling messages are exchanged that register the CTA device with the IP telephony network before a secure channel with another user can be established. Therefore, the CTA device needs to be authenticated by the IP telephony system. Otherwise, the process would be open to denial of service attacks—since some provisioning exchanges can be forged. In addition, it is desirable for the service provider to identify the CTA device—to make sure that only authorized devices are allowed in its IP Telephony network.

SUMMARY OF THE INVENTION

One embodiment of the invention comprises a system for providing key management in a client/server network. This embodiment of the invention utilizes a method to provide key management by providing a server; providing a client configured to be coupled to the server; providing a trusted third party configured to be coupled to the client; and allowing the server to initiate the key management session with the client.

One embodiment is operable as a method to generate a trigger message at the server; generate a nonce at the server; and, convey the trigger message and the nonce to the client. At the client, the client receives the trigger message and the nonce and responds by conveying a response message with a return nonce. The server can then determine that the response message is valid by comparing the values of the returned_nonce and the nonce that was generated by the server.

In addition, one embodiment can be implemented in code and by circuitry operable to produce the acts of the method.

A further understanding of the nature of the inventions disclosed herein will be realized by reference to the remaining portions of the specification and the attached drawings.

DESCRIPTION OF THE SPECIFIC EMBODIMENTS

Figure 1:
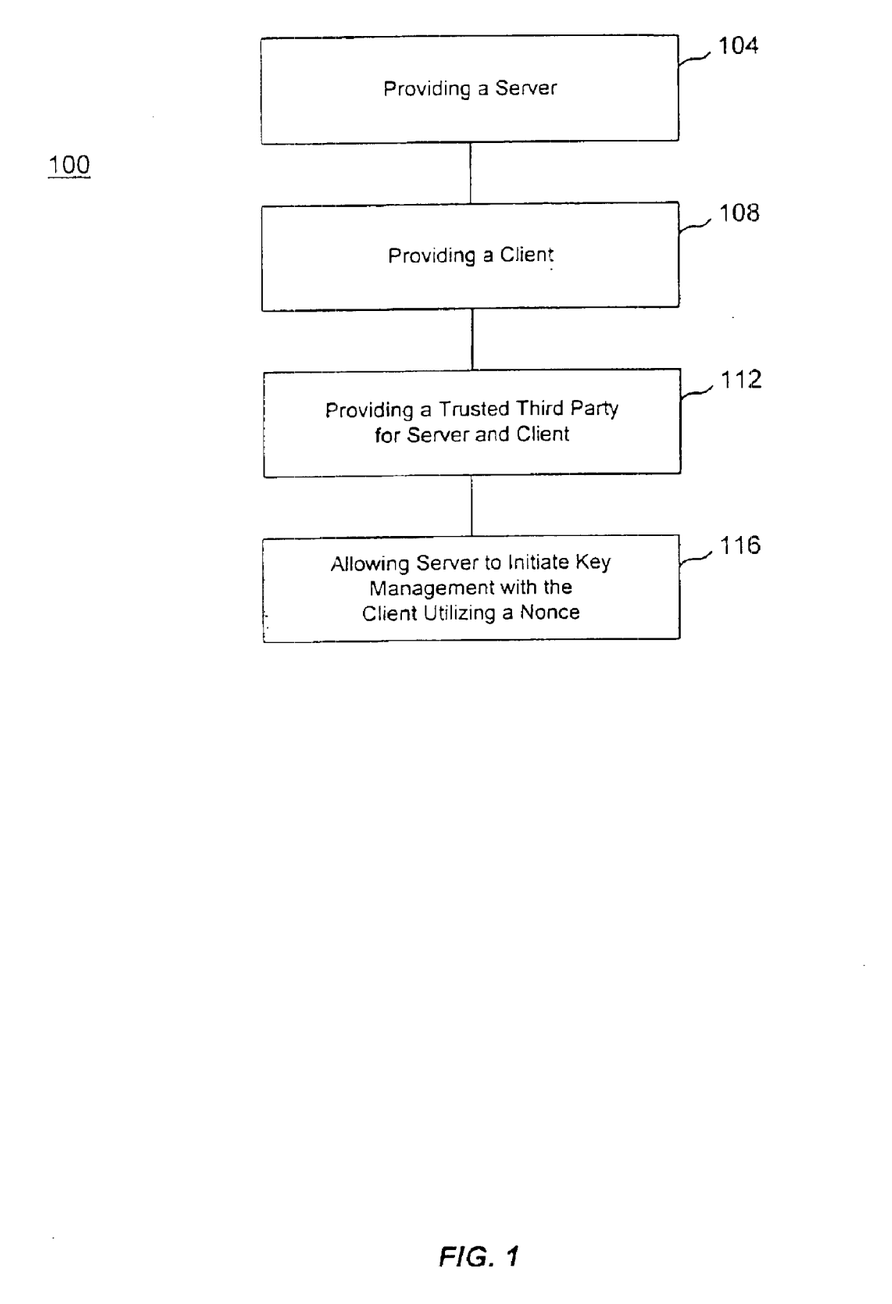
FIG. 1 shows a flow chart demonstrating an overview of one embodiment of the invention.

FIG. 1 shows a flow chart demonstrating an overview of one embodiment of the invention. In flow chart 100, a server is provided 104 and a client coupled to the server is also provided 108. A trusted third party for the server and the client is provided 112 and the server is allowed to initiate a key management session with the client by utilizing a nonce 116.

It should be understood that a server is a shared computer on a network, such as a signaling controller used in an IP telephony network. Furthermore, it should be understood that a client is a computer or device served by another network computing device, such as a cable telephony adapter (client) being served by a signaling controller (server) via an IP telephony system. In addition, it should be understood that a trusted third party for the server and the client is a device or computer utilized by at least two parties that facilitates cryptographic processes such as certifying the identity of one of the two parties to the other. Finally, it should be understood that a nonce is a number generated that is utilized only once. The use of a nonce helps to prevent an attacker from implementing a replay attack. Such a nonce can be generated randomly.

Figure 2A:
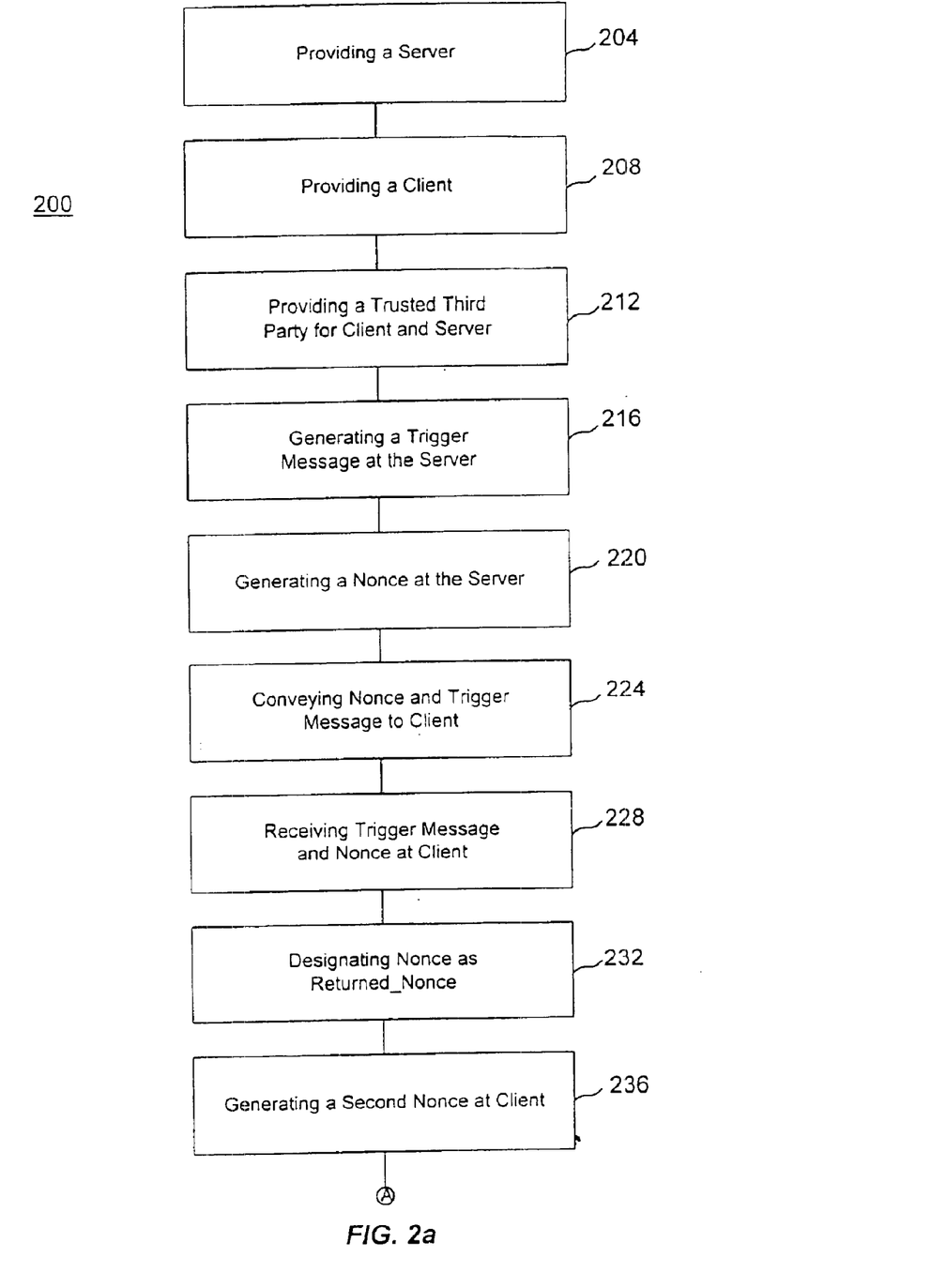
FIGS. 2A and 2B show a more detailed flow chart demonstrating a key management session between a server and a client.
Figure 2B:
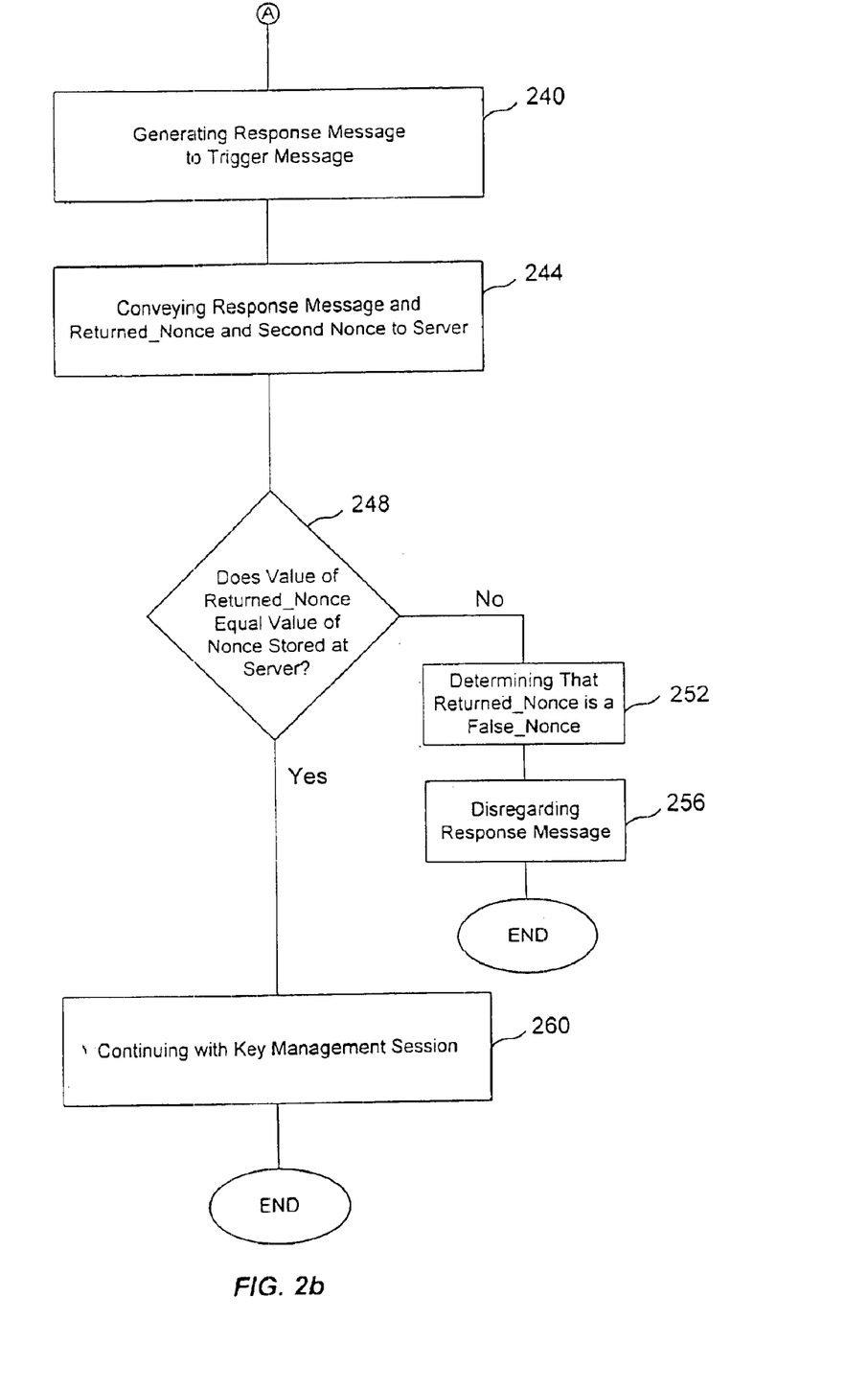

The method of FIG. 1 can be better understood by reference to FIG. 2A and FIG. 2B. In the method designated 200 in FIG. 2A and FIG. 2B, a server such as a signaling controller in an IP telephony system is provided 204. In addition, a client such as a cable telephony adapter in an IP telephony system is also provided 208. A trusted third party for the client and server, such as a key distribution center in an IP telephony system, is provided 212, as well. The server, client, and trusted third party are coupled to one another. Typically, the client initiates key management sessions with the server. However, there will be times when the server will need to initiate a key management session with the client. Rather than authenticating the trigger message (e.g. with a digital signature and certificate), the invention can utilize a nonce in the authentication of the subsequent AP Request message from the client. This embodiment of the invention does not prevent an adversary (impersonating a legitimate server) from sending an illicit trigger message to the client and fooling it into responding with an AP Request. Instead it provides that such an AP Request will be rejected by the legitimate server. This mechanism is designed to reduce the server's overhead of initiating key management exchanges with its clients, while still maintaining sufficient security. Thus, in 216 a trigger message is generated at the server to initiate a key management session. Then, a nonce is generated at the server 220 and the nonce and trigger message are coupled together and conveyed to the client 224. The client receives the trigger message and the nonce 228. Then the client designates the nonce as a returned_nonce 232. In this way, the client can return the received nonce to the server for verification that the message is from the client. In 236, a second nonce is generated at the client. The second nonce is for use by the server and client as part of the key management session being initiated. The client generates a response message to the trigger message that was received from the server 240. Then the response message, the returned_nonce, and the second nonce are conveyed to the server 244.

At the server, the value of the returned_nonce is compared to the value of the nonce which was generated at the server. If the values of the returned_nonce and the nonce stored at the server are equivalent, the key management session can proceed. However, if the value of the returned_ nonce does not equal the value of the nonce stored at the server then a determination is made that the returned_nonce is actually a false nonce 252. In such a case there is a possibility that the signal has been corrupted; or, there is a possibility that an attacker is trying to initiate a service attack. In a service attack, the attacker tries to fraudulently initiate a rekeying session in order to cause the server to utilize processor cycles which prevent the processor from utilizing those cycles for other operations. Thus the server would become less effective under such an attack than it would be under normal conditions. By repeating such an attack, an attacker can prevent the server from operating efficiently and thus can compromise the operation of the client server network, such as an IP telephony network. If the returned_nonce is determined to be not equivalent to the value of the nonce stored at the server, the response message sent with the returned_nonce is disregarded as being unauthenticated 256. However, if the returned_nonce does equal the value of the nonce stored at the server, then the key management session continues 260.

Figure 3:
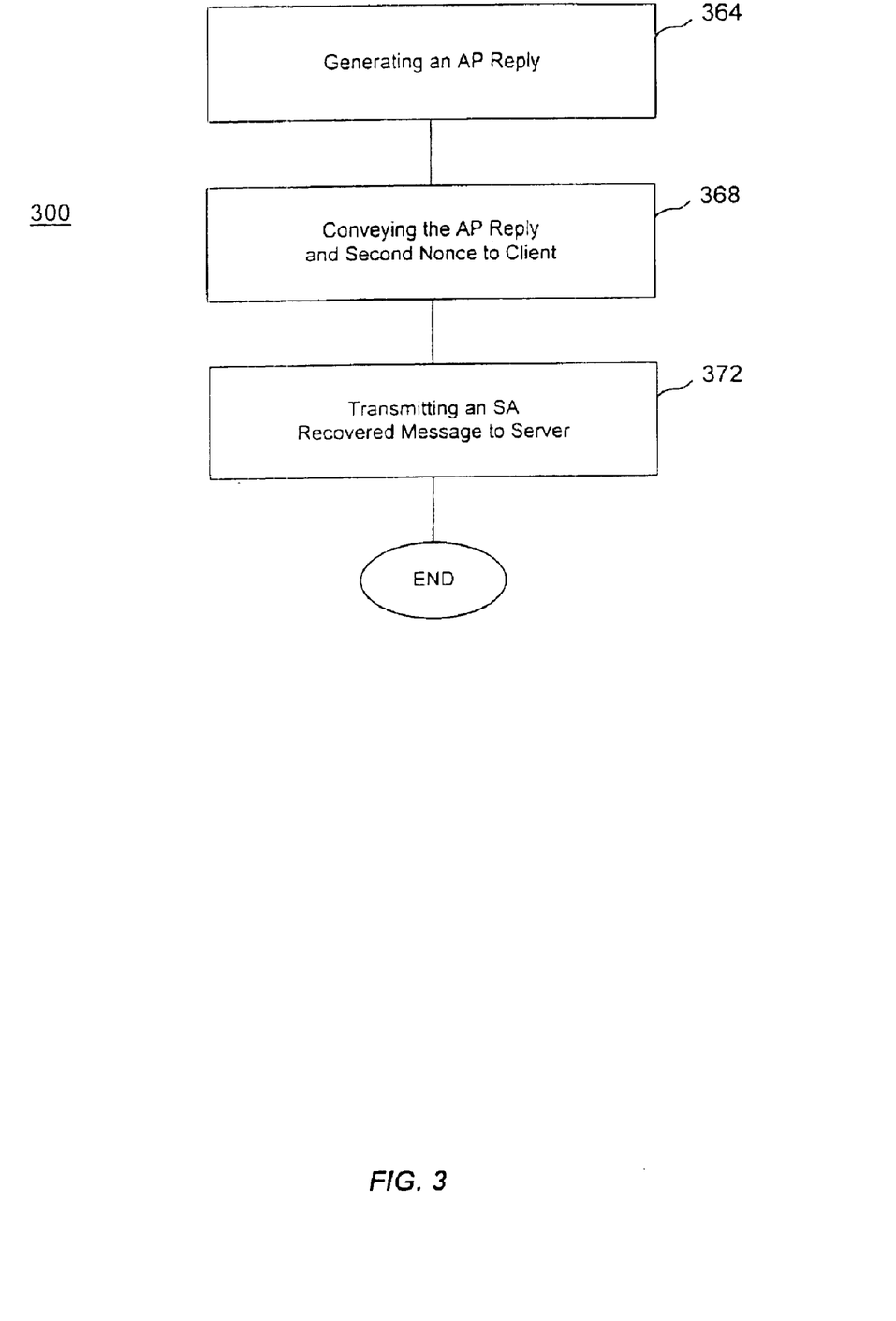
FIG. 3 shows steps of a key management session after the key management session is initiated.

FIG. 3 shows additional steps in a typical key management session as highlighted by block 260 in FIG. 2B. In FIG. 3, method 300 shows that an application (AP) REPLY is generated 364 by the server. The AP REPLY is conveyed to the client with the second nonce that was generated by the client 368. The AP Request is an abbreviation for Application Request and AP Reply stands for Application Reply. For example, these two messages can be specified by the Kerberos Key Management standard (see IETF RFC 1510). As a further example, in the context of Kerberos, the second notice can be the client's time expressed in microseconds. When the AP REPLY and second nonce are received at the client, the client transmits a security association (SA) recovered message to the server 372. This completes the applicable Kerberos key management session.

Figure 4:
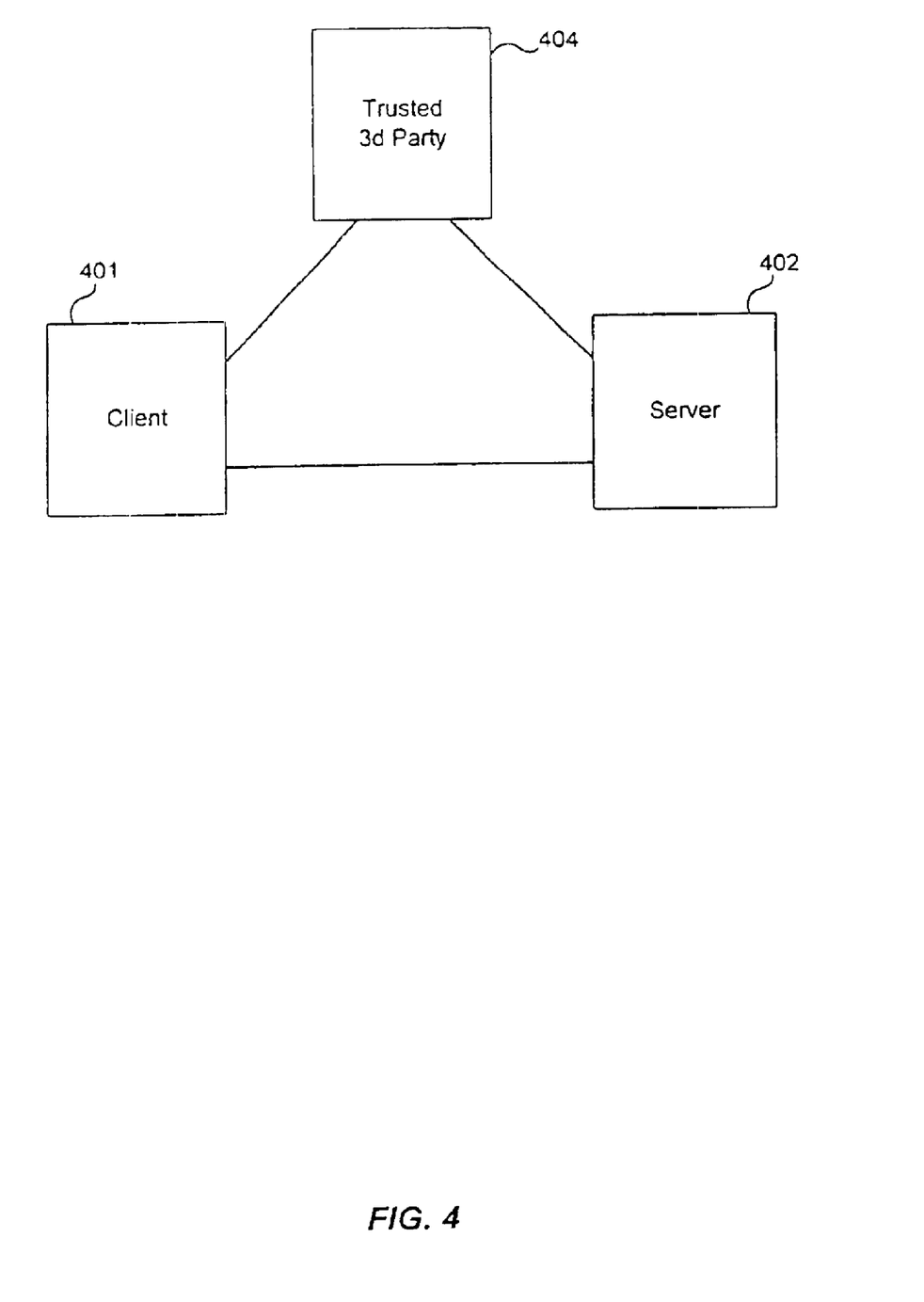
FIG. 4 shows a general block diagram of a client/server/trusted third party network.

FIG. 4 shows a block diagram of a client/server/trusted third party network. A client 401 is coupled with a server 402. In addition, the client is coupled with a trusted third party 404. The trusted third party is also coupled with the server 402. FIG. 4 thus demonstrates the network within which one embodiment of the invention can be implemented.

Figure 5:
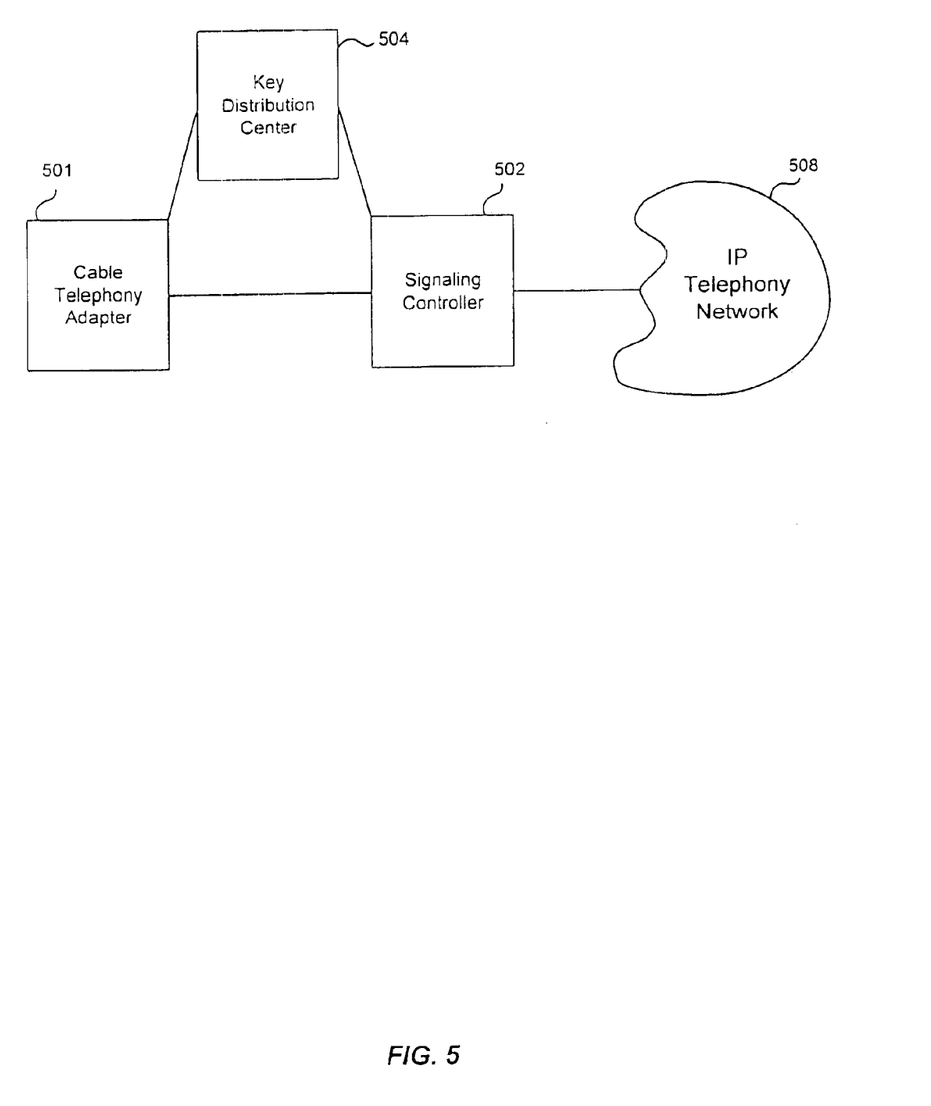
FIG. 5 shows a block diagram of an IP telephony network in which a cable telephony adapter, a signaling controller, and a key distribution center are coupled with one another.

In FIG. 5 an IP telephony network implementing one embodiment of the invention is demonstrated. A client such as a cable telephony adapter 501 is coupled with a server, such as signaling controller 502. Furthermore, the cable telephony adapter and signaling controller are also coupled to a trusted third party, illustrated as key distribution center 504. Furthermore the signaling controller is coupled with the IP telephony network 508. Such a network as that illustrated in FIG. 5 would be useful for establishing an IP telephony call from a user who is coupled to the cable telephony adapter through the IP telephony network 508 to another user connected to a similar network. Thus the user can be authenticated as the calling party through the cable telephony adapter and signaling controller when the call is placed across the IP telephony network. Further details of such a network are illustrated in the references which were incorporated by reference.

Figure 6:
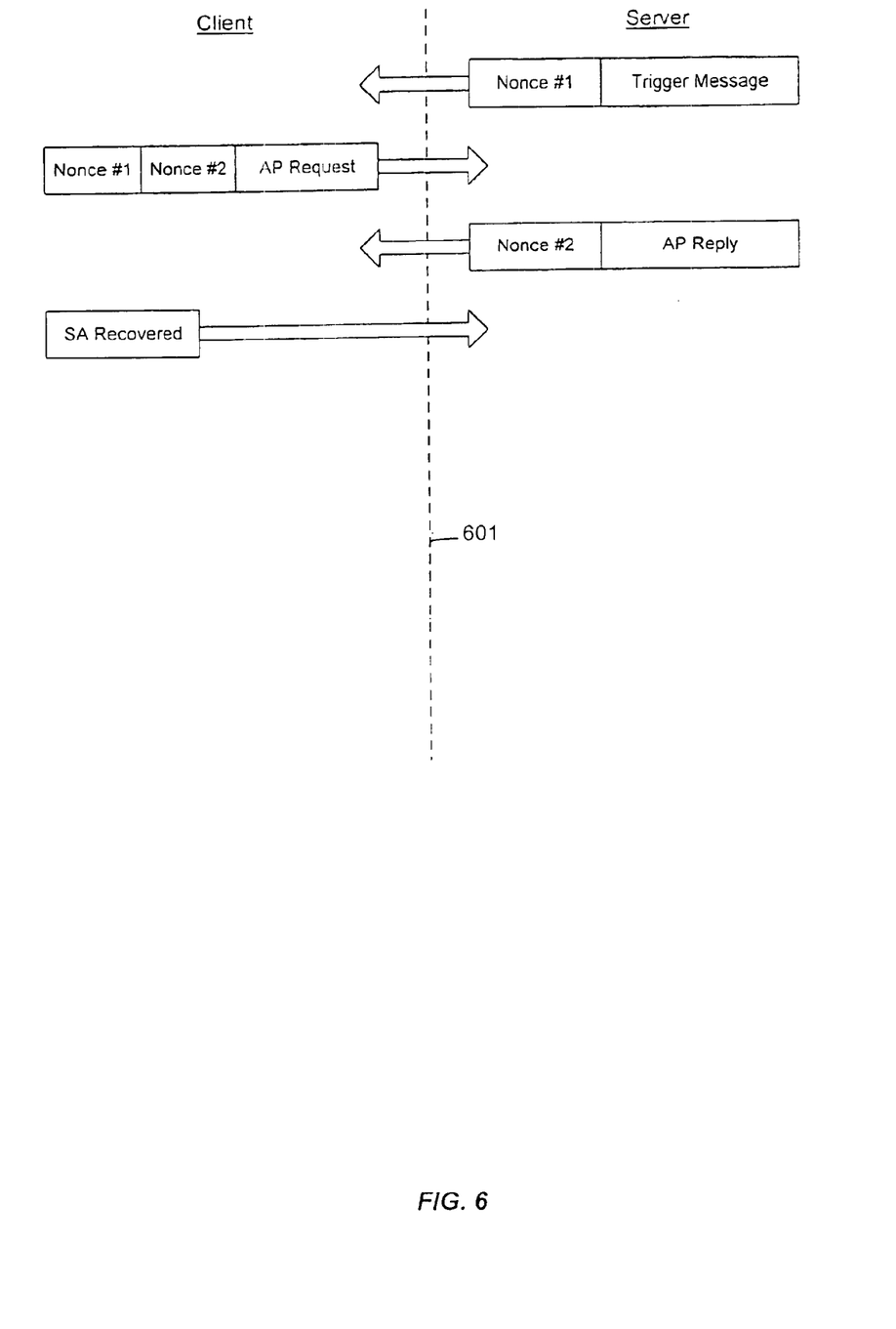
FIG. 6 shows the implementation of the data structures for establishing a key management session as implemented by one embodiment of the invention.

FIG. 6 illustrates data structures for implementing a Kerberos key management session initiated by a server in a client/server network. In FIG. 6 a nonce number 1 is coupled with an initiation signal such as a trigger or wakeup message and the combined message is transmitted across an interface 601 to the client. The client stores nonce number 1. It then adds nonce number 2 and an application request in data structure such as that shown in FIG. 6. This set of data is then transmitted across the interface back to the server. The server compares the value of received nonce number 1 with the value of nonce number 1 stored at the server so as to confirm the authenticity of the AP Request. Upon authenticating the AP Request, the server generates an AP Reply and couples it with nonce number 2 which was generated by the client. The combined nonce number 2 and AP Reply are then transmitted across the interface to the client. The client is able to verify the authenticity of the AP Reply by comparing the value of nonce number 2 received from the server with the value of nonce number 2 stored at the client. Upon authenticating the AP Reply, the client generates a Security Association (SA) recovered message and transmits that across the interface to the server. This Kerberos-based key management protocol is thereby implemented in an efficient way and furthermore allows the server to initiate the key management session with the use of only an additional nonce as overhead to the initiation message. Thus the method is highly efficient in that only a nonce need be used in the authentication process of the initiation message.

In addition to embodiments where the invention is accomplished by hardware, it is also noted that these embodiments can be accomplished through the use of an article of manufacture comprised of a computer usable medium having a computer readable program code embodied therein, which causes the enablement of the functions and/or fabrication of the hardware disclosed in this specification. For example, this might be accomplished through the use of hardware description language (HDL), register transfer language (RTL), VERILOG, VHDL, or similar programming tools, as one of ordinary skill in the art would understand. The book "A Verilog HDL Primer" by J. Bhasker, Star Galaxy Pr., 1997 provides greater detail on Verilog and HDL and is hereby incorporated by reference for all that it discloses for all purposes. It is therefore envisioned that the functions accomplished by the present invention as described above could be represented in a core which could be utilized in programming code and transformed to hardware as part of the production of integrated circuits. Therefore, it is desired that the embodiments expressed above also be considered protected by this patent in their program code means as well.

It is noted that embodiments of the invention can be accomplished by use of an electrical signal, such as a computer data signal embodied in a carrier wave, to convey the pertinent signals to a receiver. Thus, where code is illustrated as stored on a computer medium, it should also be understood to be conveyable as an electrical signal. Similarly, where a data structure is illustrated for a message, it should be understood to also be capable of being embodied in an electrical signal for transmission across a medium, such as the internet.

It is also noted that many of the structures and acts recited herein can be recited as means for performing a function or steps for performing a function, respectively. Therefore, it should be understood that such language is entitled to cover all such structures or acts disclosed within this specification and their equivalents, including the matter incorporated by reference.

It is thought that the apparatuses and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. A method of conveying a key from a server to a client compromising:

generating a wakeup message at said server;

generating a server nonce at said server;

conveying said wakeup message and said nonce to said client;

generating an AP request message at said client;

conveying a client nonce and said AP request message to said server;

confirming that said client nonce conveyed with said AP request message matches said server nonce generated at said server.

* * * * *

UNITED STATES PATENT AND TRADEMARK OFFICE
CERTIFICATE OF CORRECTION

PATENT NO. : 6,892,308 B1 Page 1 of 1
DATED : May 10, 2005
INVENTOR(S) : Alexander Medvinsky It is certified that error appears in the above-identified patent and that said Letters Patent is hereby corrected as shown below:

Column 6,
Line 16, the first word "compromising:" should read -- comprising: --.

Signed and Sealed this

Sixteenth Day of August, 2005

JON W. DUDAS
*Director of the United States Patent and Trademark Office*